(12) United States Patent
Eggleston

(10) Patent No.: US 12,339,114 B2
(45) Date of Patent: Jun. 24, 2025

(54) HYBRID RAMAN AND OPTICAL COHERENCE TOMOGRAPHY IMAGING

(71) Applicant: Nokia of America Corporation, Murray Hill, NJ (US)

(72) Inventor: Michael Eggleston, New York, NY (US)

(73) Assignee: Nokia of America Corporation, Murray Hill, NJ (US)

(*) Notice: Subject to any disclaimer, the term of this patent is extended or adjusted under 35 U.S.C. 154(b) by 11 days.

(21) Appl. No.: 15/840,490

(22) Filed: Dec. 13, 2017

(65) Prior Publication Data

US 2018/0188019 A1 Jul. 5, 2018

Related U.S. Application Data

(60) Provisional application No. 62/441,337, filed on Dec. 31, 2016.

(51) Int. Cl.
*G01B 11/22* (2006.01)
*G01B 9/02001* (2022.01)
(Continued)

(52) U.S. Cl.
CPC .......... *G01B 11/22* (2013.01); *G01B 9/02004* (2013.01); *G01B 9/02007* (2013.01); *G01B 9/02091* (2013.01); *G01N 21/65* (2013.01); *G01N 21/4795* (2013.01); *G01N 2021/655* (2013.01)

(58) Field of Classification Search
CPC .......... G01N 2021/653–656; G01N 2021/655; G01N 21/4795; G01N 21/65; G01B 11/22;
(Continued)

(56) References Cited

U.S. PATENT DOCUMENTS 6,134,003 A * 10/2000 Tearney ............. G01N 21/4795
356/497
6,501,551 B1 * 12/2002 Tearney ............. G01B 9/02091
356/477
(Continued)

FOREIGN PATENT DOCUMENTS

CN 1073007 A 6/1993
CN 1973178 A 5/2007
(Continued)

OTHER PUBLICATIONS

Tsai, Meng-Tsan et al., "Quantitative Phase Imaging With Swept-Source Optical Coherence Tomography for Optical Measurement of Nanostructures", IEEE Photonics Technology Letters, vol. 24, No. 8, Apr. 15, 2012, http://ieeexplore.ieee.org/document/6140545/, pp. 640-642.
(Continued)

*Primary Examiner* — Hina F Ayub
(74) *Attorney, Agent, or Firm* — McCarter & English, LLP

(57) ABSTRACT

An apparatus includes first and second light sources, an optical interferometer, one or more light detectors, and an electronic processor. The second light source is configured to output light of a different wavelength than the first source. The optical interferometer has optical reference and sample arms. The optical sample arm has a first optical path to transmit light received from the first and second light sources to an area of a target and has a second optical path to transmit light collected from the area of the target to one or more interference regions. The optical reference arm is configured to transmit light received from the first light source to the one or more interference regions. Each light detector is configured to produce electrical signals indicative of measured intensities of interfered light in a corresponding one of the one or more interference regions. The electronic
(Continued)

processor is configured to determine, from the electrical signals, information indicative of a depth dependence of stimulated Raman optical emission in the area of the target.

20 Claims, 5 Drawing Sheets

(51) Int. Cl.
  *G01B 9/02004* (2022.01)
  *G01B 9/02091* (2022.01)
  *G01N 21/47* (2006.01)
  *G01N 21/65* (2006.01)

(58) Field of Classification Search
  CPC ............ G01B 9/02004; G01B 9/02007; G01B 9/02091
  See application file for complete search history.

(56) References Cited

U.S. PATENT DOCUMENTS

| | | | | |
|---|---|---|---|---|
| 7,277,178 | B2* | 10/2007 | Shpantzer | G01N 21/39 356/451 |
| 8,300,229 | B2* | 10/2012 | Cho | G01J 3/02 356/451 |
| 8,346,329 | B2* | 1/2013 | Xu | A61B 5/1455 600/316 |
| 8,446,592 | B1* | 5/2013 | Arissian | G01B 9/02092 356/484 |
| 10,767,974 | B1* | 9/2020 | Chen | G01B 9/02091 |
| 10,942,112 | B2* | 3/2021 | Rowe | G01B 9/0205 |
| 11,415,406 | B2* | 8/2022 | Komatsuzaki | H01S 3/1062 |
| 2005/0105099 | A1* | 5/2005 | Shpantzer | G01N 21/65 356/517 |
| 2005/0140982 | A1* | 6/2005 | Chen | A61B 5/0073 356/479 |
| 2006/0132790 | A1* | 6/2006 | Gutin | G01B 9/02034 356/479 |
| 2009/0236528 | A1* | 9/2009 | Shpantzer | G01J 3/0218 356/301 |
| 2012/0002211 | A1* | 1/2012 | Cho | G01J 3/02 356/451 |
| 2012/0127464 | A1 | 5/2012 | Oigawa et al. | |
| 2013/0243422 | A1* | 9/2013 | Hauske | H04B 10/07 398/25 |
| 2014/0253919 | A1 | 9/2014 | Yui | |
| 2014/0328365 | A1 | 11/2014 | Grujic et al. | |
| 2015/0253240 | A1* | 9/2015 | Rowe | G01J 9/02 356/451 |
| 2015/0256266 | A1* | 9/2015 | Duthel | H04B 10/07955 398/38 |
| 2015/0276483 | A1 | 10/2015 | Mikami | |
| 2016/0169806 | A1* | 6/2016 | Dantus | G01N 33/227 356/301 |
| 2019/0285539 | A1* | 9/2019 | Rowe | G01J 3/45 |
| 2020/0033259 | A1* | 1/2020 | Krausz | G01N 21/3586 |
| 2021/0190474 | A1* | 6/2021 | Komatsuzaki | G01B 9/02004 |

FOREIGN PATENT DOCUMENTS

| | | |
|---|---|---|
| CN | 101587276 A | 11/2009 |
| CN | 103123285 A | 5/2013 |
| EP | 2 762 859 A1 | 8/2014 |
| WO | 9305359 A1 | 3/1993 |

OTHER PUBLICATIONS

Eom, Tae Joong et al., "High speed optical coherence tomography image guided femto-second laser cataract surgery system", 2015 15th International Conference on Control, Automation and Systems (ICCAS 2015), Oct. 13-16, 2015 in BEXCO, Busan, Korea, http://ieeexplore.ieee.org/document/7364665/, pp. 1863-1865.

Fercher A.F. et al., "Optical coherence tomography—principles and applications", Reports on Progress in Physics, vol. 66, No. 2, 2003, pp. 239-303.

Kuranov, Roman V. et al., "Prediction Capability of Optical Coherence Tomography for Blood Glucose Concentration Monitoring", J. of Diabetes Science and Technology, vol. 1, No. 4, 2007, pp. 470-477.

Larin, K. V., et al., "Noninvasive Blood Glucose Monitoring With Optical Coherence Tomography, A pilot study in wman subjects", Diabetes Care, vol. 25, No. 12, 2002, pp. 2263-2267.

Enejder, A. M. K. et al., "Raman spectroscopy for noninvasive glucose measurements", J. of Biomedical Optics, vol. 10, No. 3, 2005, pp. 031114-1-031114-9.

Leahy, M. et al., "Functional imaging for regenerative medicine", Stem Cell Research & Therapy, vol. 7:57, Dec. 2016, 13 pgs.

Wegner, K. D. et al., "Quantum dots: bright and versatile in vitro and in vivo fluorescence imaging biosensors", Chem. Soc. Rev., vol. 44, 2015, pp. 4792-4834.

Nune, S. K. et al., "Nanoparticles for biomedical imaging", Expert Opinion Drug Deliv., vol. 6, No. 11, Nov. 2009, pp. 1175-1194.

Patil, C. A. et al., "Combined Raman spectroscopy and optical coherence tomography device for tissue characterization", Optics Letters, vol. 33, No. 10, May 15, 2008, pp. 1135-1137.

Evans, C. L. et al., "Coherent Anti-Stokes Raman Scattering Microscopy: Chemical Imaging for Biology and Medicine", Annual Review of Analytical Chemistry, vol. 1, No. 1, 2008, pp. 883-909.

Potma, E. O. et al., "Theory of Coherent Raman Scattering", Chapter 1, in Coherent Raman Scattering Microscopy, CRC Press, 2013 (edited by J. Cheng and X. S. Xie), pp. 3-42.

Freudiger, C. W. et al., "Label-Free Biomedical Imaging with High Sensitivity by Stimulated Raman Scattering Microscopy", Science, vol. 322, No. 5909, Dec. 2008, pp. 1857-1861.

Robles, Francisco E., et al., "Stimulated Raman scattering spectroscopic optical coherence tomography", Optica, vol. 4, No. 2, Feb. 2017, pp. 243-246.

Robles, Francisco E.., et al., "Dispersion-based stimulated Raman scattering spectroscopy, holography, and optical coherence tomography", Optics Express, vol. 24, No. 1, Jan. 11, 2016, pp. 485-498.

Jacob, Desmond, et al., "Fourier domain pump-probe optical coherence tomography imaging of Melanin", Optics Express, vol. 18, No. 12, Jun. 7, 2010, pp. 12399-12410.

Bredfeldt, Jeremy S. et al., "Molecularly sensitive optical coherence tomography", Optics Letters, vol. 30, No. 5, Mar. 1, 2005, pp. 495-497.

PCT International Search Report, PCT/US2017/066984, dated Mar. 6, 2018, 5 pgs.

Office action received for corresponding Chinese Patent Application No. 201780081668.5, dated Sep. 22, 2020, 8 pages of office action and 3 pages of Summarized Translation available to applicant.

Office action received for corresponding Chinese Patent Application No. 201780081668.5, dated Sep. 27, 2021, 7 pages of office action with 2 pages of a partial Summary Translation available to applicant.

Office action received for corresponding Chinese Patent Application No. 201780081668.5, dated May 19, 2021,10 pages of office action and 6 pages of Summarized Translation therefor.

Office action received for corresponding European Patent Application No. 17829435.1, dated May 4, 2021, 6 pages.

Office action received for corresponding Indian Patent Application No. 201917030841, dated Mar. 30, 2021, 7 pages.

Office action received for corresponding Chinese Patent Application No. 201780081668.5, dated Feb. 24, 2022, 4 pages of office action and 3 pages of Summarized Translation available.

* cited by examiner

HYBRID RAMAN AND OPTICAL COHERENCE TOMOGRAPHY IMAGING

This application claims the benefit of U.S. provisional application 62/441,337, filed Dec. 31, 2016, by Michael S. Eggleston.

BACKGROUND

Technical Field

The inventions relate to optical imaging apparatus and methods.

Discussion of the Related Art

This section introduces aspects that may be helpful to facilitating an understanding of the inventions. Accordingly, the statements of this section are to be read in this light and are not to be understood as admissions about what is in prior art or what is not in prior art.

Technologies for imaging biological organisms, in vivo, are useful for monitoring health and for making medical diagnoses. On such class of imaging technologies is optical coherence tomography (OCT). OCT produces images based on reflective or refractive index variations in a region being imaged.

OCT can rapidly produce three-dimensional images of tissues over significant depth ranges with high resolution. OCT is presently used, e.g., to measure retinal abnormalities, to detect cancers of the skin, and to make 3D images of layered objects such as paintings. OCT is also being considered for diagnostic applications in dentistry, gastroenterology, and hemostatic therapy. OCT can even be used to non-invasively sense some biomarkers, e.g., blood glucose.

BRIEF SUMMARY

Since conventional OCT images typically image based on variations in reflection and/or refraction, such images can be insensitive to the chemical composition of the region being imaged. Such an image may not distinguish whether a variation in reflection or refraction is due to change in the concentration of a particular dissolved solute or is due to variation in temperature. Herein, various embodiments provide OCT systems and methods configured to gather imaging information based on stimulated Raman scattering. For this reason, some such embodiments can produce images sensitive to the chemical composition of the region being imaged.

In one embodiment, an apparatus includes first and second light sources, an optical interferometer, one or more light detectors, and an electronic processor. The second light source is configured to output light of a different wavelength than the first source, e.g., either a shorter wavelength or a longer wavelength. The optical interferometer has optical reference and sample arms. The optical sample arm has a first optical path to transmit light received from the first and second light sources to an area of a target and has a second optical path to transmit light collected from the area of the target to one or more interference regions. The optical reference arm is configured to transmit light received from the first light source to the one or more interference regions. Each light detector is configured to produce electrical signals indicative of measured intensities of interfered light in a corresponding one of the one or more interference regions. The electronic processor is configured to determine, from the electrical signals, information indicative of a depth dependence of stimulated Raman optical emission in the area of the target.

In some embodiments of the above apparatus, the second light source may be configured to transmit light to the optical sample arm during first intervals and to not transmit light to the optical sample arm during second intervals, and the electronic processor may be configured to determine said information based on the intensities measured in response to the target receiving light from the optical sample arm in the first and second intervals. In some such embodiments, the first light source may be configured to transmit light to the optical sample arm during both the first intervals and the second intervals.

In some embodiments of any of the above apparatus, the optical interferometer may further include first and second optical hybrids, wherein each optical hybrid is connected to receive light from the optical reference arm and the optical sample arm. In some such embodiments the one or more light detectors may include first and second light detectors, and the apparatus may include a differential electrical amplifier. Each of the first and second light detectors may be configured to produce electrical signals indicative of measured intensities of light interfered in a corresponding one of the optical hybrids and to deliver said produced electrical signals to a corresponding input of the differential electrical amplifier. In some such embodiments, the differential electrical amplifier may be connected to simultaneously receive at one input thereof one of the electrical signals produced in response to the second light source transmitting light to the optical sample arm and to receive at another input thereof another of the electrical signals produced in response to the second light source not transmitting light to the optical sample arm.

In some embodiments, any of the above apparatus may further include a scanner to laterally scan light from the optical sample arm over an area of the target.

In some embodiments of any of the above apparatus, the electronic processor may be configured to sweep an output wavelength of one or both of the light sources, e.g., the first light source.

In some embodiments of any of the above apparatus, the electronic processor may be configured to produce an optical coherence tomography image of a part of the target based on the information.

In other embodiments, a method includes measuring first light intensities, measuring second light intensities, and producing image data for a region of a target based on the measured first and second intensities. The first light intensities are made by interfering light from a first light source with light emitted from the region of the target in response to the region being illuminated with light from both a second light source and the first light source. The light from the second light source has a different wavelength than the light from the first light source, e.g., either a shorter wavelength or longer wavelength. Light from the first light source is able to stimulate Raman light emission from the region in response to the region being illuminated with light from the second light source. The second light intensities are made by interfering light from the first light source with light emitted from the region of the target in response to the region being illuminated with light from the first light source while not being illuminated with light from the second light source.

In some embodiments, the above method may further include producing an optical coherence tomography image of the region based on the image data.

In any embodiments of the above method, the method may further include laterally scanning light of the first light source over the region to produce the light collected from the region.

In any embodiments of the above method, the method may further include laterally scanning light of the second light source over the region to produce the first light intensities.

In any embodiments of the above method, the method may further include sweeping an output wavelength of the first light source and/or second light source, e.g., while performing the above described laterally scanning.

BRIEF DESCRIPTION OF THE SEVERAL VIEWS OF THE DRAWINGS

In the Figures and text, like reference symbols indicate elements with similar or the same function and/or similar or the same structure.

In the Figures, relative dimension(s) of some feature(s) may be exaggerated to more clearly illustrate the feature(s) and/or relation(s) to other feature(s) therein.

Herein, various embodiments are described more fully by the Figures and the Detailed Description of Illustrative Embodiments. Nevertheless, the inventions may be embodied in various forms and are not limited to the embodiments described in the Figures and the Detailed Description of Illustrative Embodiments.

DETAILED DESCRIPTION OF ILLUSTRATIVE EMBODIMENTS

U.S. provisional patent application 62/441,337 is incorporated herein, by reference, in its entirety.

Various embodiments may be configured to produce images based on stimulated Raman scattering. To detect light emitted from a target region, the emitted light may be interfered with light of the same source used to stimulate Raman scattering (SRS), e.g. inelastic Raman scattering, and the interference is measured, e.g., intensities of interfered light are measured. Due to the use of such phase-sensitive detection, the various embodiments are able to obtain information about the position and/or the depth of the material emitting light via the stimulated Raman scattering. Thus, some such embodiments can obtain information about the position and/or depth, in the target, of the absorbers of the pump light used to pump the absorbers for SRS. In some embodiments, such information is used to produce image(s) of the parts of the target producing light via stimulated Raman scattering. Indeed, such use of stimulated Raman scattering light can also provide, in some embodiments, information about the composition of the target producing such light.

Figure 1:
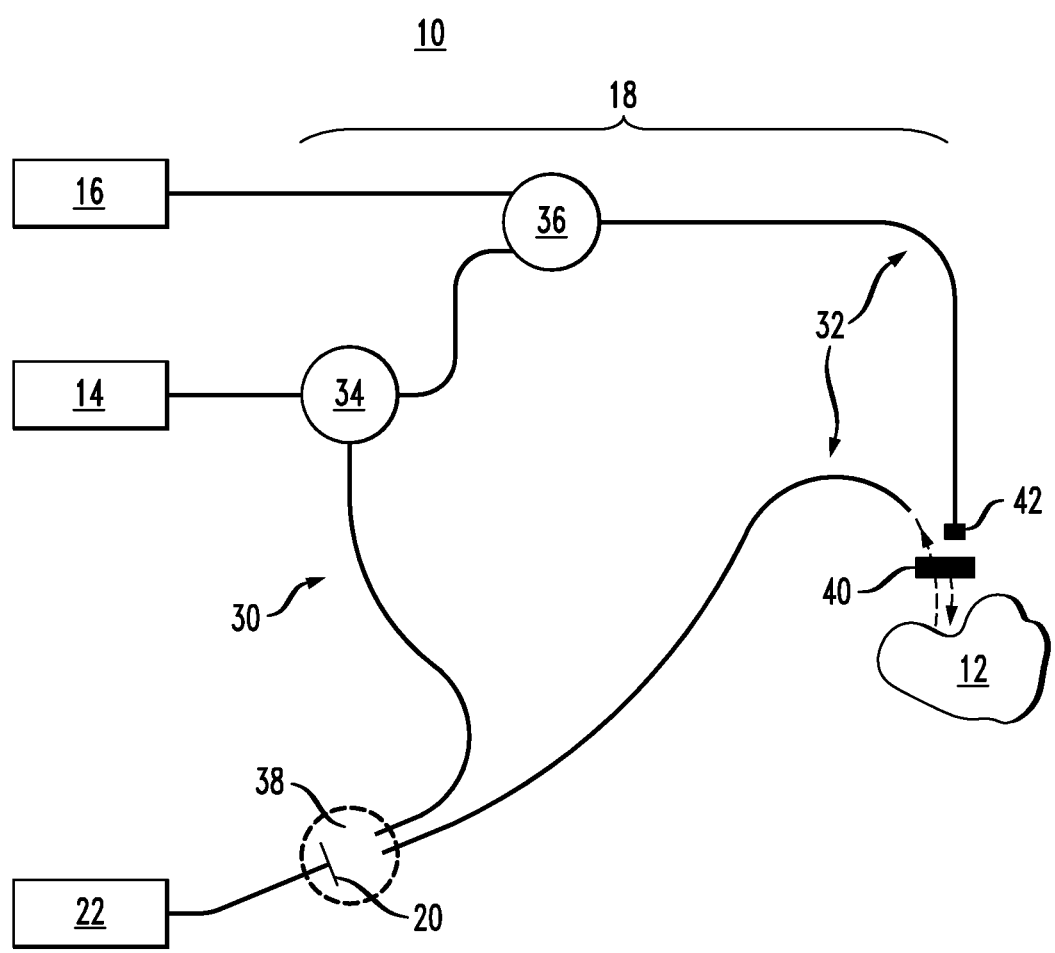
FIG. 1 schematically illustrates an embodiment of an imaging apparatus that is configured to use stimulated Raman scattering (SRS)

FIG. 1 schematically illustrates an apparatus 10 that is configured to acquire image information from a region of a target 12 based on stimulated Raman scattering therein, e.g., inelastic Raman scattering. The apparatus may use the image information to produce a one-dimensional (1D), a two-dimensional (2D), or a three-dimensional (3D) image of the region or a part thereof. The apparatus 10 includes first and second light sources 14, 16; an optical interferometer 18; a light detector 20; and an electronic processor 22.

The first and second light sources 14 and 16 produce light for stimulating light emission from matter of the target 12 and for Raman pumping of matter of the target 12, respectively. The first and second light sources 14, 16 may be, e.g., lasers or light emitting diodes. The second light source 16 typically has a different output wavelength than the first light source 14.

For example, the second light source 16 may have a shorter wavelength than the first light source 14 so that an atom or molecule of the target 12 may undergo a series of de-excitations in response to absorbing a photon from the second light source 16, and one light emitting de-excitation of the series may be stimulated by longer wavelength and lower energy photon(s) of the first light source 14. Since the first light source 14 stimulates said emission, the emitted light is expected to have some phase coherence with respect to stimulating light of the first light source 14.

In alternate embodiments, the second light source 16 may have a longer wavelength than the first light source 14. In such embodiments, the Raman pumping may cause optical loss of the light of the first light source 14 in the target 12. Then, the apparatus 10 may be used to coherently measure such optical loss.

The optical interferometer 18 has an optical reference arm 30 and an optical sample arm 32. The optical reference and sample arms 30, 32 connect to the first and second light sources 14, 16 via an optical splitter 34 and an optical combiner 36. The optical splitter 34 receives light from the first light source 14 and transmits a first part of the received light to an input of the optical reference arm 30 and transmits a second part of the received light to an input of the optical combiner 36. The optical combiner 36 receives light from the second light source 16 and from the first light source 14, i.e., via the optical splitter 34, and directs said received light to an input of the optical sample arm 32.

The optical interferometer 18 also has one or more optical interference regions 38 that receive light from outputs of the optical reference and sample arms 30, 32. The optical sample arm 32 includes a first optical path that illuminates a region of the target 12 with received light. The sample arm 32 also includes a second optical path that collects a portion of the light emitted from the same region of the target 12, e.g., via elastic and inelastic scattering. The second optical path of the optical sample arm 32 collects said emitted light and transmits said light to the one or more optical interference regions 38. Thus, in the one or more optical interference regions 38, light from the first light source 14 is mixed and interfered with emitted light collected from the illuminated region of the target 12.

The one or more light detectors 20 are configured or placed to measure the intensity of interfered light in the one or more interference regions 38. Since the interfered light is received from the optical reference and sample arms 30, 32, the one or more light detectors 20 measure an interference of light collected from the target 12 with light from the first light source 14. Since such measurements of interference are phase-sensitive, the measurements of the light detectors 20 are able to provide an indication of the emission and/or scattering depth of said collected light in the target 12.

The electronic processor 22 receives electrical signals indicative of the phase-sensitive measurements of light intensities from the one or more light detectors 20. From the received electrical signals, the processor 22 obtains information on the stimulated emission light from the target 12. Since said signals are the result of phase-sensitive detection, the obtained information can include data related to the depth in the target 12 of the emitters of such light, e.g., an absolute depth if the light from the light source 14 is of low temporal coherence and, in some embodiments, even if said light is not of low temporal coherence. In some embodiments, the processor 22 may form a 1D, 2D, or 3D image of the target 12 directly from measured intensities of the interfered stimulated Raman light itself. In other embodiments, the processor 22 may use said information for thresholding conventional 1D, 2D, or 3D OCT images of the target 12. For example, the processor may selectively accept measurements of conventionally scattered light to make a 1D, 2D, or 3D OCT image of a region of the target 12 in response to the measured intensity of such stimulated Raman light being above threshold value for the same image region of the target 12. In both such embodiments, the resulting images may be materially or chemically specific, e.g., only imaging lipid or protein in a biological form for the target 12 in response to the threshold being set for stimulated Raman emissions from lipid or protein, respectively. Thus, the phase-sensitive measurement of collected Raman light emissions can enable the processor 22 to produce a chemical-sensitive image of the target 12 in some such embodiments.

In some embodiments of the apparatus 10, the optical sample arm 32 may optionally include conventional focusing optics 40 to focus light from one or both of the light sources 14, 16 onto a small lateral region of the target 12, which is to be imaged. In addition, one or both of the light beams from the light sources 14, 16 may be rapidly pulsed to increase peak light intensities therein. Such focusing and/or pulsing can increase light intensities in the region of the target 12 to be imaged and thus, increase relative rates for stimulated Raman emission of light therefrom.

In some embodiments, the apparatus 10 may also include a conventional 1D, 2D or 3D optical scanner 42. Such an optical scanner 42 may be configured to scan the light beam from the sampling arm 32 over a 1D, 2D, or 3D pattern in the target 12 thereby producing light for making scanned image(s) of a part of the target 12.

Figure 2:
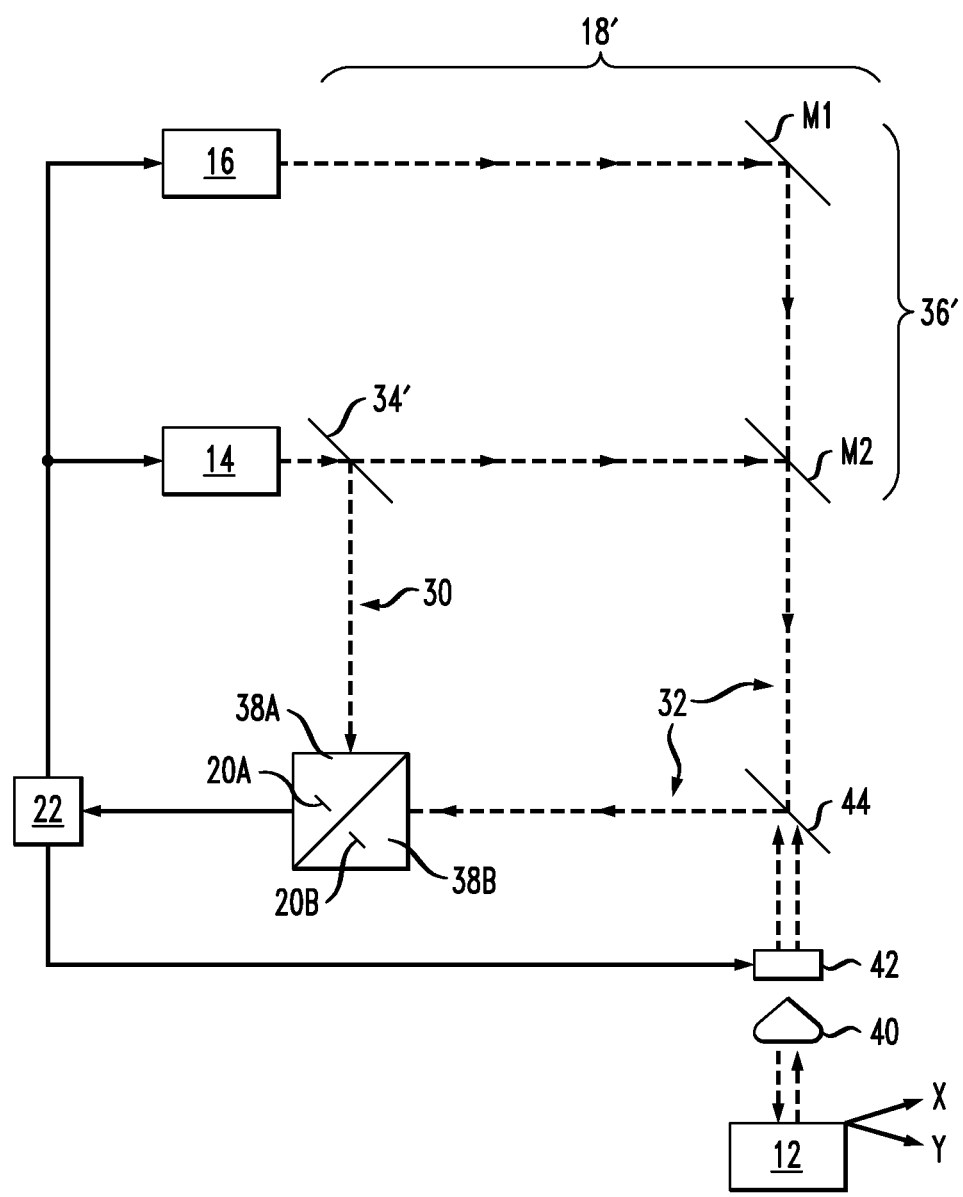
FIG. 2 schematically illustrates a specific embodiment of the apparatus of FIG. 1, which uses at least one swept frequency light source.
Figure 3:
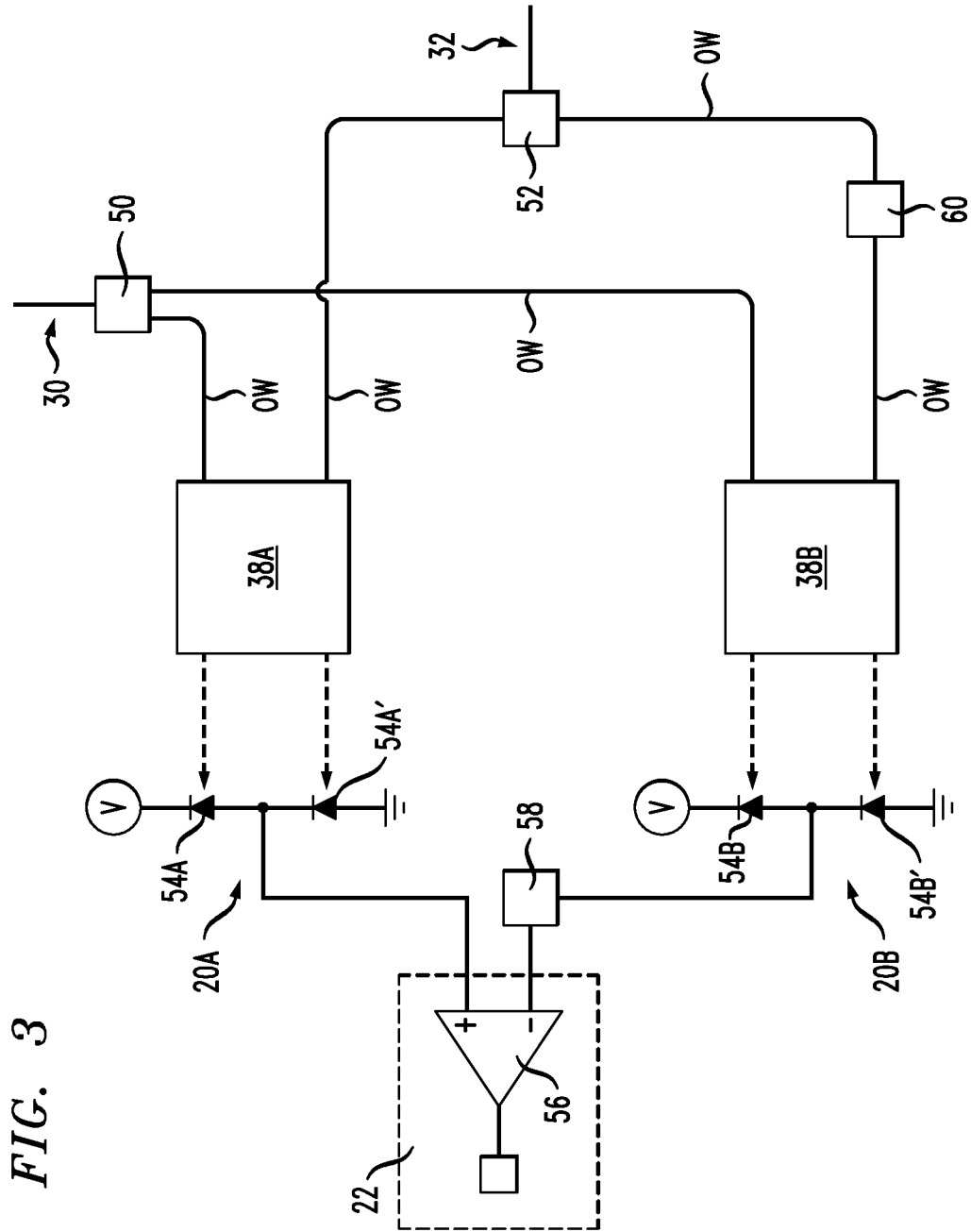
FIG. 3 schematically illustrates an exemplary detector for the apparatus of FIG. 2.

FIGS. 2-3 schematically illustrate specific embodiments 10' of the apparatus 10 of FIG. 1. FIG. 2 illustrates an example of the optical interferometer 18 and processor 22, which has two interference regions 38A, 38B. FIG. 3 illustrates examples of said two interference regions 38A, 38B and corresponding light detectors 20A, 20B.

In FIGS. 2-3, dashed lines with arrowheads schematically indicate optical paths of light beams, and solid lines indicate optical paths or electrical leads as appropriate. Whereas various optical paths and optical components of FIGS. 2-3 may be schematically illustrated as free space or optical waveguide paths or devices, i.e., for simplicity, a person of ordinary skill in the relevant arts would readily understand from teachings of this application how to replace illustrated free space and optical waveguide devices of FIGS. 2-3 with optical waveguide and free space devices, respectively.

FIG. 2 schematically illustrates the optical interferometer 18' of the apparatus 10'. The optical interferometer 18' includes an optical splitter 34', an optical combiner 36', focusing optics 40, a lateral optical scanner 42, am optical coupler 44, two interference regions 38A, 38B, two corresponding light detectors 20A, 20B, and an electronic processor 22.

The optical splitter 34' receives light from the first light source 14 and transmits a portion of said light to the optical combiner 36' and transmits a remaining portion to the input of the optical reference arm 30. The optical splitter 34' is illustrated as a partially silvered mirror, but the partially silvered mirror could be replaced by any conventional optical splitter, e.g., a planar waveguide power splitter.

The optical combiner 36' receives light of the first light source 14, i.e., from the optical splitter 34', and receives light from the second light source 16, i.e., a Raman pump source. The optical combiner 36' combines the received light, into one light beam, and directs the light beam to an input of the optical sample arm 32. The optical combiner 36' is illustrated as a series of a first mirror (M1) and a second partially silvered or wavelength-selective mirror (M2), but the series could be replaced by any conventional optical combiner, e.g., a planar waveguide, optical, power combiner.

The focusing optics 40 directs the light beam of the first segment of the optical sample arm 32 into a small light spot on or in the target 12. The light spot includes light from both light sources 14, 16 during temporal intervals in which both light sources transmit light to the optical sample arm 32. The focusing optics 40 may be formed by, e.g., a series of one or more conventional lenses, e.g., convex lenses.

The lateral optical scanner 42 can be any conventional mechanical optical scanner or optical phase array type of scanner, e.g., a conventional solid-state optical phase array, for scanning a light beam over a line on or in the target 12 or over a 2D lateral area of the target 12, e.g., a 1D scan may scan in the lateral x-direction, or a 2D scan may scan in both the lateral x- and the lateral y-directions.

The optical coupler 44 is configured to deliver light from the first segment of the optical sample arm 32 to the mechanical scanner 42 and focusing optics 40 and to collect light emitted from the target 12, e.g., via the mechanical scanner 42 and focusing optics 40, and to deliver said collected light to the second segment of the optical sample arm 32. That is, light emitted from the target 12 is directed by the optical coupler 44 to the second segment of the optical sample arm 32. The optical coupler 44 is illustrated as a partially silvered mirror, but could be formed by various optical components, e.g., a 3-port optical circulator.

Each interference region 38A, 38B interferes light that is received from both the optical reference arm 30 and the optical sample arm 32. Said light may be interfered, e.g., based on a low temporal coherence of the first light source 14.

Each light detector 20A, 20B is a coherent optical detector that makes measurements of the intensity of interfered light in a corresponding one of the interference regions 38A, 38B so that the light collected from the target 12 is detected in a phase-sensitive manner. The light detectors 20A, 20B output electrical signals indicative of said measurements.

The electronic processor 22 is electrically connected to control the first and second light sources 14, 16 and the lateral optical scanner 42. The electronic detector 22 is connected to electrically receive and process the electrical signals from the light detectors 20A, 20B. From said electrical signals received from the light detectors 20A and 20B, a digital processor of the electronic processor 22 is configured to produce image data or an image of the scanned portion of the target 12. In particular, the image data or image is based on light generated by stimulated Raman scattering in the target 12.

Unfortunately, the illumination of the target 12 by the first and second light sources 14, 16 typically causes the target to emit light due to elastic or Rayleigh scattering (RS) and to emit light due to inelastic or stimulated Raman scattering (SRS). The optical sample arm 32 delivers both types of emitted light from the target 12 to the two interference regions 38A, 38B. The Rayleigh scattering (RS) light is typically noise that the electronic processor 22 removes to produce image data or images of a portion of the target 12. Thus, the image data or image(s) is(are) produced, by the processor 12, based on light generated in the target 12 by stimulated Raman scattering (SRS).

Figure 4A:
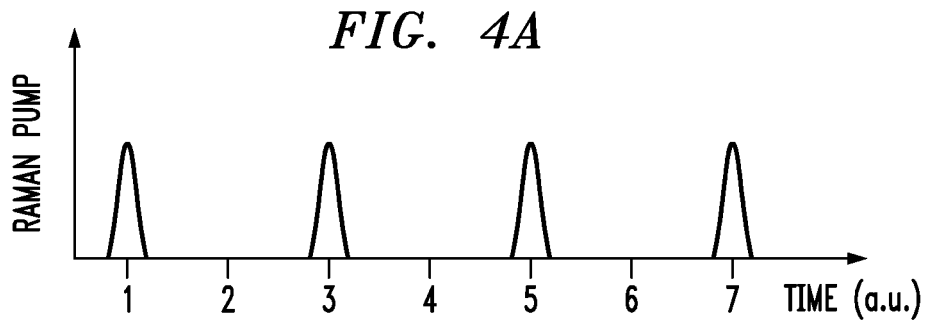
FIGS. 4A, 4B, and 4C are timing diagrams schematically illustrating an exemplary set of light pulse sequences that may be used to operate the apparatus of FIGS. 1-3.
Figure 4B:
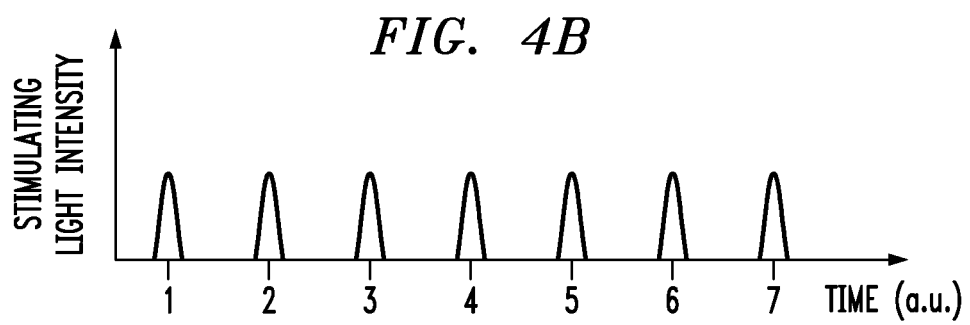
Figure 4C:
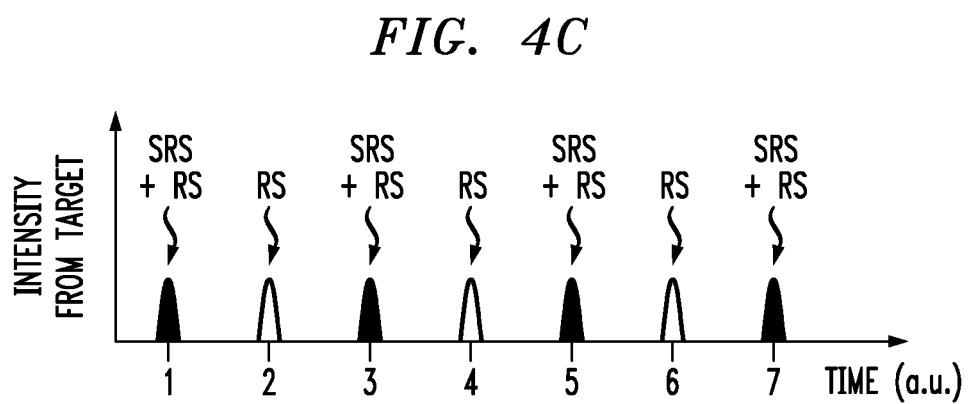

To remove such noise light from Rayleigh scattering, the electronic processor 22 can operate the first and second light sources 14, 16 in a pulsed mode, as illustrated in FIGS. 4A-4C. The pulsing may be produced by direct modulation or by external modulation of the first and second light sources 14, 16. Direct modulation of laser embodiments of the two light sources 14, 16 can produce high peak intensities, e.g., increasing the relative intensity of stimulated Raman scattering over the intensity of Rayleigh scattering in the target 12.

FIGS. 4A-4C illustrate an example of pulsed operation of the first and second light sources 14, 16 and the form of resulting pulsed light emissions from the target 12. The first light source 14 and the second light source 16, i.e., the Raman pump source, are pulsed in a synchronized manner by the electronic processor 22 as illustrated in respective FIGS. 4B and 4A. The pulsing is such that the first light source 14 emits light in all time intervals, and the second light source 16 does not emit light in all of said time intervals. For example, as shown in FIGS. 4A-4C, the second light source 16 may emit light in second time intervals and the first light source 14 may emit light in first and the second time intervals, wherein the first and second time intervals are temporally interleaved. Due to such synchronized pulsing of the two light sources 14, 16, the target 12 emits different types of light in the two types of time intervals as illustrated by FIG. 4C. In such first time intervals, for which both light sources 14, 16 emit light, the target 12 emits light produced by both SRS and RS, i.e., darkened images of FIG. 4C. In the other second time intervals, for which only the first light source 14 emits light, the target 12 only emits RS light, i.e., lighter images of FIG. 4C.

Image data and/or images of the target 12 are created by the electronic processor 22 based on measurements in the interference regions 38A, 38B, i.e., for time intervals, for which only the first light source 14 is pulsed ON and for other time intervals, for which both light sources 14, 16 are pulsed ON. By using light emissions from the target for both types of time intervals, the electronic processor 22 is able to remove the RS emission component from measurements for the time intervals, in which both of the light sources 14, 16 are pulsed ON and thus, transmitting light to the target 12 via the first segment of the optical sample arm 32.

FIG. 3 illustrates an embodiment of the interference regions 38A, 38B, the light detectors 20A, 20B, and the electronic processor 22 of FIG. 2. The electronic processor 22 is configured to determine phase-sensitive measurements of SRS light emitted from the target 12 based on measurements for the different pulsing intervals of the two light sources 14, 16, e.g., as illustrated in FIGS. 4A-4C.

In this embodiment, the outputs of the optical reference arm 30 and the optical sample arm 32 are connected to corresponding 1×2 optical splitters 50 and 52. The 1×2 optical splitters 50, 52 may be, e.g., conventional 50/50 optical power splitters. Each of the 1×2 optical splitters 50, 52 connects to one input of each optical hybrid 38A, 38B, e.g., via an optical waveguide (OW), so that both 1×2 optical splitters 50, 52 connect to inputs of both optical hybrids 38A, 38B. Thus, each optical hybrid 38A, 38B receives light from both the optical reference arm 30 and the optical sample arm 32. The optical hybrids may be, e.g., conventional 2×2 optical waveguide interference devices.

Each optical hybrid 38A, 38B, mixes light from the optical reference and sample arms 30, 32 with different relative phases at the two outputs thereof. In each optical hybrid 38A, 38B, the light of the two inputs is mixed with a relative phase difference of about $\pi$ radians between the two outputs, e.g., up to a phase error of not more than 5% and preferably not more than 2%, and even possibly not more than 1%. For such mixing, the interference mixing of input contributions produces pure squared sums of input light contributions of approximately opposite relative signs at the two outputs of the same optical hybrid 38A, 38B, i.e., due to balanced detection thereat.

For each optical hybrid 38A, 38B, a balanced pair of light detectors (54A, 54A'), (54B, 54B'), e.g., pairs of photodiodes, measures the output light intensities. A balanced pair of photodiodes is a pair of similar or identical photodiodes, which are biased in series by a direct current (DC) voltage source, V. A balanced pair has an electrical output located between the photodiodes of the balanced pair. Each light detector of the balanced pairs (54A, 54A'), (54B, 54B') receives light from a corresponding one of the outputs of the corresponding optical hybrid 38A, 38B. For each balanced pair (54A, 54A'), (54B, 54B'), the output electrical signal measures the intensity of the mixing between light on the two inputs of the corresponding optical hybrid 38A, 38B without the non-mixing or squared optical signal contributions therein, e.g., after conventional filtering.

The electronic processor 22 receives the output electrical signals from the two balanced pairs (54A, 54A'), (54B, 54B') at the two inputs of a differential amplifier 56. In particular, the differential amplifier 56 receives the output electrical signals from the first balanced pair (54A, 54A') and the second balanced pair (54B, 54B') corresponding to different pulse intervals for the two light sources 14, 16. That is, the first balanced pair (54A, 54A') delivers an output electrical signal for an RS interval in FIGS. 4A-4C, and the second balanced pair (54B, 54B') simultaneously delivers an output electrical signal, e.g., for the next SRS interval in FIGS. 4A-4C. For that reason, the electrical signal output by the differential amplifier 56 is a phase-sensitive measure of the RS light signal from the target 12 minus a phase-sensitive measure of the SRS plus RS light signal from the target 12.

To deliver measurements of light for different types of pulsing intervals of the light sources 14, 16, the output electrical signals from the first and second balanced pairs (54A, 54A'), (54B, 54B') can be relatively delayed at the differential amplifier 56, or alternatively, the light from the optical sample arm 32 can be relatively delayed at the input to the optical hybrids 38A, 38B. For the former embodiment, the electronic processor 22 may include an electrical delay element 58 of one pulse interval of the light source 14 at one input of the differential amplifier 56. For the latter embodiment, an optical delay element 60 of one pulse interval of the first light source 14 is located between optical splitter 52 and an input of the optical hybrid 38B.

In alternate unillustrated embodiments, the apparatus of FIG. 3 may be modified such that light for an RS interval is mixed with light of a previous SRS interval of FIGS. 4A-4C. For example, the optical delay element 60, of one pulse interval of FIG. 4B, may be moved to the other optical input of the optical hybrid 38B in such an embodiment. Alternately, the electrical delay element 58 of one pulse interval of FIG. 4B may be moved to the other electrical input of the differential amplifier 56 in FIG. 3. Typically, only one of the delay elements 58 or 60 is used in such embodiments.

For the light detectors 38A, 38B, phase-sensitive detection of the light collected from the target 12 enables the detection of information on the depth of the portion of the target 12 emitting or scattering said light. In particular, the mixed component of the measured intensity of interfered light in the optical hybrids 38A, 38B is proportional to either the frequency or the wavelength difference of the interfered light and to any optical path difference between the optical reference and sample arms 30, 32 over which said light has propagated. Various embodiments of the apparatus 10' of FIG. 2 use this phase dependency to determine the depth of an emitting region in the target 12.

In some embodiments, the first light source 14 has a central output frequency that is swept by the electronic controller 22 over a fixed range while the frequency of the second light source 16 is, e.g., kept fixed. In such an embodiment, the measured intensities from the light detectors 20A, 20B exhibit beating at a period that is a measure of the relative path difference between the optical reference and sample arms 30, 32. Measurement of such a beat frequency provides a measure of the relative depth of light emitters in the target 12. In such embodiments, the electronic processor 22 is configured to use such beating of measured interference intensities by one or both of the light detectors 20A, 20B to determine relative positions of light emitters in the target 12. That is, the electronic processor 22 may use such signal beating to obtain a depth image data based on SRS.

In some such embodiments, the first light source 14 may be a laser with an output wavelength of about 1300 nanometers (nm) whose wavelength is swept over 20 nm, e.g., in a sawtooth sweep configuration. The laser may have a pulse rate of about 1 giga-hertz and a narrow pulse width of about 10 pico-seconds. In such an embodiment, the second light source 16 may be a laser with a different output wavelength, e.g., a shorter output wavelength of about 1060 nanometers and a pulse rate of about 0.5 giga-Hertz. In such an embodiment, the electronic processor 22 would synchronize both lasers to illuminate the target 12 at the same time at the 0.5 giga-Hertz rate.

In some alternate embodiments, the output frequency of the second light source 17 may be swept rather than the output frequency of the first light source 14. Also, the frequency of both light sources 14, 16 may be swept at about the same time.

Figure 5:
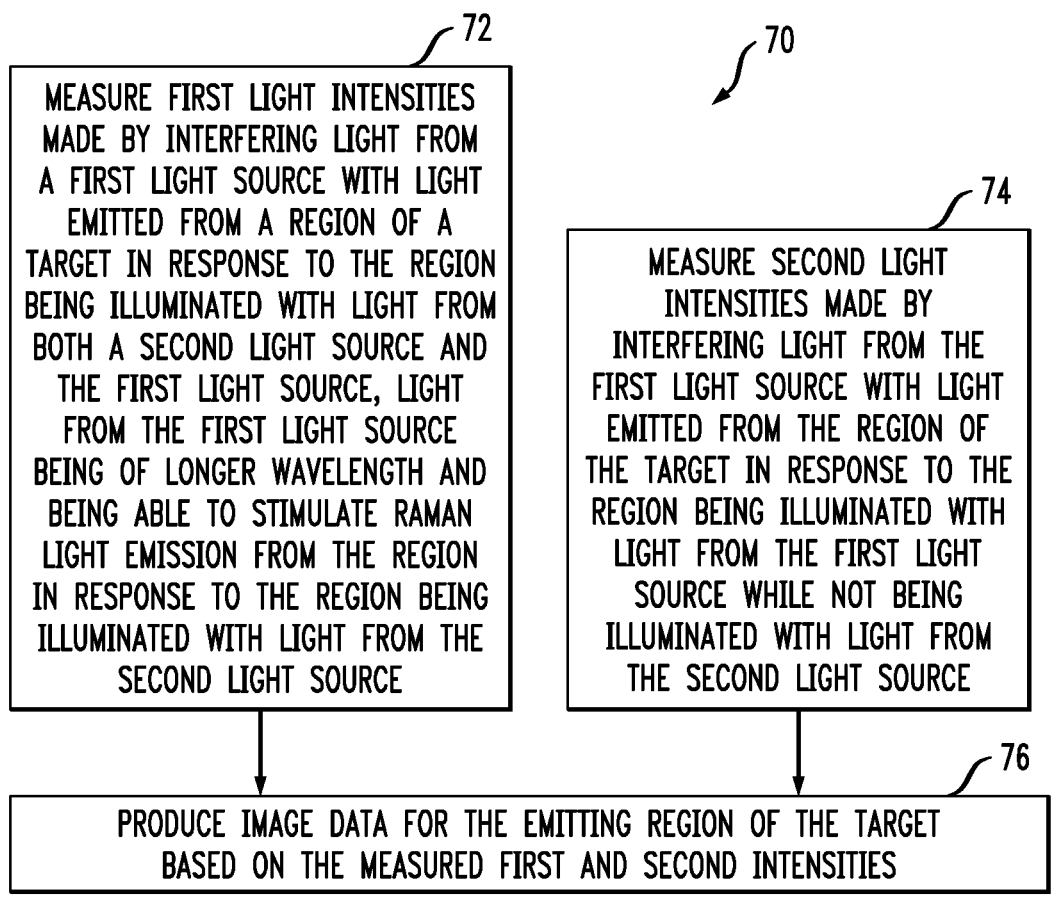
FIG. 5 is a flow chart illustrating a method for performing optical coherence tomography (OCT), e.g., using the apparatus of FIGS. 1, 2, and 3, and, in some embodiments, using light pulse sequences as illustrated in FIGS. 4A-4C.

FIG. 5 illustrates a method 70 for performing optical coherence tomography (OCT), e.g., using the apparatus 10, 10' of FIGS. 1, 2, and 3.

The method 70 includes measuring first light intensities made by interfering light from a first light source with light emitted from a region of a target in response to the region being illuminated with light from both a second light source and the first light source (step 72). Light from the second light source has a different output wavelength than light from the first light source. For example, if the second light source has a shorter output wavelength, light of the first light source is able to stimulate Raman light emission from the region in response to the region being illuminated with light from the second light source. If the second light source has a longer output wavelength, an additional loss of light of the first light source by Raman in the region may occur in response to the region being illuminated with light from the second light source. Here, the first and second light sources may be, e.g., the respective first and second light sources 14 and 16 of FIGS. 1 and 2. Also, the interfering may occur, e.g., in the interference region 38 of FIG. 1, e.g., in the optical hybrids 38A, 38B of FIGS. 2 and 3, and the light intensities may be measured, e.g., by the light detectors 20 and 20A, 20B of FIGS. 1 and 2-3, respectively.

The method 70 includes measuring second light intensities made by interfering light from the first light source with light emitted from the region of the target in response to the region being illuminated with light from the first light source while not being illuminated with light from the second light source (step 74). Here, the interfering may occur in region 38 of FIG. 1, e.g., in the optical hybrids 38B, 38A of FIGS. 2 and 3, and may be measured by the light detectors 20 and 20B, 20A of FIGS. 1 and 2-3, respectively.

The method 70 also includes producing image data for the emitting region of the target based on the measured first and second intensities (step 76). The image data may be produced, e.g., by the electronic processor 22 of FIGS. 1 and 2.

In some embodiments, the method 70 may further include step(s) of laterally scanning light of the first light source over the region of the target to produce the emitted light therefrom. The scanning step(s) may be performed, e.g., by the optical scanner 42 of FIGS. 1 and 2.

In some embodiments, the method 70 may further include laterally scanning light of the second light source over the region of the target to produce the first light intensities measured in the step 72. Said scanning step(s) may be performed, e.g., by the same optical scanner 42 of FIGS. 1 and 2.

In some embodiments, the method 70 may further include sweeping an output wavelength of the first light source while producing the first and second light intensities measured in the steps 72 and 74. For example, such sweeping may be performed, under the control of the electronic processor 22 of FIGS. 1 and 2, while performing the scanning step(s).

In alternate embodiments, the method 70 may further include sweeping an output wavelength of the second light source while producing the first and second light intensities measured in the steps 72 and 74.

In some embodiments, the method 70 may include sweeping output wavelengths of both the first and the second light sources while producing the first and second light intensities measured in the steps 72 and 74.

From the disclosure, drawings, and claims, other embodiments of the invention will be apparent to those skilled in the art.

What is claimed is:

1. An apparatus, comprising:
a first light source;
a second light source to output light of a different wavelength than the first light source;
an optical interferometer having optical reference and sample arms and an optical hybrid, the optical sample arm having a first optical path to transmit to an area of a target light from both light sources in first intervals and light from a single one of the light sources in second intervals, the optical sample arm having a second optical path to transmit light collected from the area of the target to the optical hybrid, the optical reference arm being configured to transmit light received from the first light source to the optical hybrid; and a light detector configured to produce an electrical signal, for phase-sensitive detection of light from the target, from light interfered by the optical hybrid; and an electronic processor configured to determine information indicative of a depth dependence of stimulated Raman optical emission in the area of the target based on a difference between the electrical signals produced by the light detector from pulsed light from the first light source and the second light source to remove noise light from Rayleigh scattering using an unmodulated beam of light transmitted from the optical reference arm, the light detector being responsive to the optical hybrid receiving light emitted by the area of the target in one of the first intervals and receiving light emitted by the area of the target in one of the second intervals;

wherein the first light source has a first frequency swept over a fixed range and the second light source has a second frequency fixed such that the electrical signal produced by the light detector exhibits a beat frequency that provides a measure of a depth of the optical emission in the area of the target.

2. The apparatus of claim 1, wherein the second light source is configured to output light of a shorter wavelength than the first source.

3. The apparatus of claim 1, wherein the apparatus comprises a differential electrical amplifier, the light detector being configured to deliver said electrical signal produced thereby to a corresponding input of the differential electrical amplifier.

4. The apparatus of claim 3, wherein the differential electrical amplifier is connected simultaneously to receive at one input thereof one of the electrical signals produced in response to the second light source transmitting light to the optical sample arm and to receive at another input thereof another of the electrical signals produced in response to the second light source not transmitting light to the optical sample arm.

5. The apparatus of claim 1, further comprising a scanner to laterally scan light from the optical sample arm over an area of the target.

6. The apparatus of claim 5, wherein the optical interferometer further comprises first and second optical hybrids, each optical hybrid being connected to receive light from the optical reference arm and the optical sample arm.

7. The apparatus of claim 5, wherein the second light source is configured to transmit light to the optical sample arm during first intervals and to not transmit light to the optical sample arm during second intervals and the electronic processor is configured to determine said information based on the intensities measured in response to the optical sample arm receiving light in the first and second intervals.

8. The apparatus of claim 7, wherein the first light source is configured to transmit light to the optical sample arm during both the first intervals and the second intervals.

9. The apparatus of claim 7, wherein the electronic processor is configured to sweep an output wavelength of, at least, one of the light sources.

10. The apparatus of claim 1, wherein the electronic processor is configured to sweep the output wavelength of one of the light sources.

11. The apparatus of claim 1, wherein the electronic processor is configured to produce an optical coherence tomography image of a part of the target based on the information.

12. The apparatus of claim 1, wherein the electrical signal produced by the light detector comprises a first phase-sensitive electrical measurement of light from the target by measuring interference, by the optical hybrid, of light from the first light source with light emitted from a region of the target in response to the region being illuminated with light from both the second light source and the first light source, and wherein a second phase-sensitive electrical measurement of light from the target by measuring interference, by the optical hybrid, of light from the first light source with light emitted from the region of the target in response to the region being illuminated with light from the first light source while not being illuminated with light from the second light source.

13. A method, comprising:

producing a first phase-sensitive electrical measurement of light from a target by measuring interference, by an optical hybrid, of light from a first light source with light emitted from a region of the target in response to the region being illuminated with light from both a second light source and the first light source, the light from the second light source having a different wavelength than the light from the first light source, light from the first light source being able to stimulate Raman light emission from the region in response to the region being illuminated with light from the second light source;

producing a second phase-sensitive electrical measurement of light from the target by measuring interference, by the optical hybrid, of light from the first light source with light emitted from the region of the target in response to the region being illuminated with light from the first light source while not being illuminated with light from the second light source; and producing image data for the region of the target based on a difference between the first phase-sensitive electrical measurement and the second phase-sensitive electrical measurement;

wherein the light from both the first light source and the second light source is pulsed to remove noise light from Rayleigh scattering using an unmodulated beam of light transmitted from an optical reference arm; and wherein the first light source has a first frequency swept over a fixed range and the second light source has a second frequency fixed such that the electrical signal produced by the light detector exhibits a beat frequency that provides a measure of a depth of the light emission in the area of the target.

14. The method of claim 13, wherein the light from the second light source has a shorter wavelength than the light from the first light source.

15. The method of claim 14, further comprising producing an optical coherence tomography image of the region based on the image data.

16. The method of claim 14, further comprising laterally scanning light of the first light source over the region to produce the light emitted from the region.

17. The method of claim 16, further comprising laterally scanning light of the second light source over the region to produce the first light intensities.

18. The method of claim 16, further comprising sweeping an output wavelength of, at least, one of the light sources while performing the laterally scanning.

19. The method of claim 13, further comprising sweeping an output wavelength of one of the light sources.

20. The method of claim 14, further comprising sweeping an output wavelength of one of the light sources.

\* \* \* \* \*